United States Patent
Jung

(10) Patent No.: US 6,507,377 B1
(45) Date of Patent: Jan. 14, 2003

(54) MOULD WITH U-SHAPED LATCHES FOR HOLDING LCD CELL AND FRAME

(75) Inventor: Yun-Hwan Jung, Pusan-shi (KR)

(73) Assignee: Samsung SDI Co., Ltd., Kyonggi-do (KR)

(*) Notice: Subject to any disclaimer, the term of this patent is extended or adjusted under 35 U.S.C. 154(b) by 76 days.

(21) Appl. No.: 09/584,918

(22) Filed: May 31, 2000

(30) Foreign Application Priority Data

Jun. 28, 1999 (KR) .............................. 99-11666

(51) Int. Cl.⁷ ............................................. G02F 1/1333
(52) U.S. Cl. ............................................ 349/60; 349/58
(58) Field of Search ................................. 349/58, 59, 60

(56) References Cited

U.S. PATENT DOCUMENTS

| | | | | | |
|---|---|---|---|---|---|
| 4,165,607 A | * | 8/1979 | Fedorowicz et al. | ........ | 58/50 R |
| 4,422,728 A | * | 12/1983 | Andreaggi | .................. | 350/334 |
| 4,950,072 A | * | 8/1990 | Honda | ......................... | 353/12 |
| 5,137,488 A | * | 8/1992 | Yeh | ......................... | 446/397 2 |
| 5,274,486 A | * | 12/1993 | Yamazaki et al. | ............ | 359/83 |
| 5,570,267 A | * | 10/1996 | Ma | ............................. | 361/681 |
| 5,659,376 A | * | 8/1997 | Uehara et al. | ................. | 349/58 |
| 5,675,396 A | * | 10/1997 | Tsunehiro | .................... | 349/59 |
| 5,703,665 A | * | 12/1997 | Muramatsu et al. | .......... | 349/60 |
| 5,867,235 A | * | 2/1999 | Hasegawa | .................... | 349/58 |
| 5,946,061 A | * | 8/1999 | Kurihara et al. | .............. | 349/58 |
| 6,064,453 A | * | 5/2000 | Inubushi et al. | .............. | 349/58 |
| 6,125,030 A | * | 9/2000 | Mola et al. | .................. | 361/681 |

\* cited by examiner

*Primary Examiner*—Toan Ton
*Assistant Examiner*—Andrew Schechter
(74) *Attorney, Agent, or Firm*—Robert E. Bushnell, Esq.

(57) ABSTRACT

A liquid crystal display mounting assembly includes a frame for receiving a liquid crystal cell, a mould for receiving the frame, and a plurality of suspensions integrally formed with the mould to support the frame by urging an outer wall of the frame against an inner wall of the mould. The frame is provided with a plurality of concave step portions, and the suspensions are formed corresponding to the concave step portions. Each of the suspensions is U-shaped and provided with a hook which is hooked on the corresponding concave step portion of the frame.

1 Claim, 2 Drawing Sheets

MOULD WITH U-SHAPED LATCHES FOR HOLDING LCD CELL AND FRAME

BACKGROUND OF THE INVENTION

1. Field of the Invention

The present invention relates to a liquid crystal display and, more particularly, to a liquid crystal display mounting assembly which enables the easy mounting of a liquid crystal cell in a display case.

2. Description of Related Art

Generally, a liquid crystal display includes a liquid crystal cell having a pair of substrates. Transparent electrodes are disposed on each of the substrates and the substrates are disposed such that the electrodes face each other. A cell gap is formed between the substrates by spacers, and liquid crystal material is disposed within the liquid crystal cell. Such a liquid crystal cell is coupled to a drive circuit board.

To couple the liquid crystal cell to the drive circuit board, the liquid crystal cell is received in a frame and legs are provided to the frame. The legs are inserted into through holes formed on the drive circuit board, then bent to be fixedly coupled to the drive circuit board.

The above-described technology is very useful when the liquid crystal cell is large. However, such a technology is not useful in the case where the size of the liquid crystal cell is small, such as with cellular phones. In particular, the liquid crystal cell used for cellular phones is directly installed in a cellular phone case without the use of a frame.

However, in recent years, with the use of the cellular phone for a variety of purposes such as Internet communications and to transmit images, it is necessary for a display of the cell phone to be large.

Although the technology for enlarging the display of the cellular phone exists, it is necessary to provide means for protecting the enlarged display from outer shock. That is, the cellular phone should be designed to prevent the display from being damaged when it is dropped (e.g., from a height of about 1.5 m).

Therefore, a metal frame has been used to protect the display. However, this technology increases the overall size and weight of the cellular phone. In addition, the metal frame does not absorb the outer shock but directly transmits the same to the display of the cellular phone.

SUMMARY OF THE INVENTION

Therefore, the present invention has been made in an effort to solve the above described problems of the conventional technologies.

It is an objective of the present invention to provide a liquid crystal display assembly that can reduce a size (i.e., a profile) of a device where it is applied and absorb outer shock applied to the device.

To achieve the above objective, the present invention provides a liquid crystal display mounting assembly including a frame for receiving a liquid crystal cell, a mould for receiving the frame, and a plurality of suspensions integrally formed with the mould to support the frame by urging an outer wall of the frame against an inner wall of the mould.

The frame is provided with a plurality of concave step portions, and the suspensions are formed corresponding to the concave step portions, each of the suspensions being U-shaped and provided with a hook which is hooked on the corresponding concave step portion of the frame.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION OF PREFERRED EMBODIMENT

Reference will now be made in detail to the present preferred embodiment of the invention, an example of which is illustrated in the accompanying drawings. Wherever possible, the same reference numbers will be used throughout the drawings to refer the same or like part.

Figure 1:
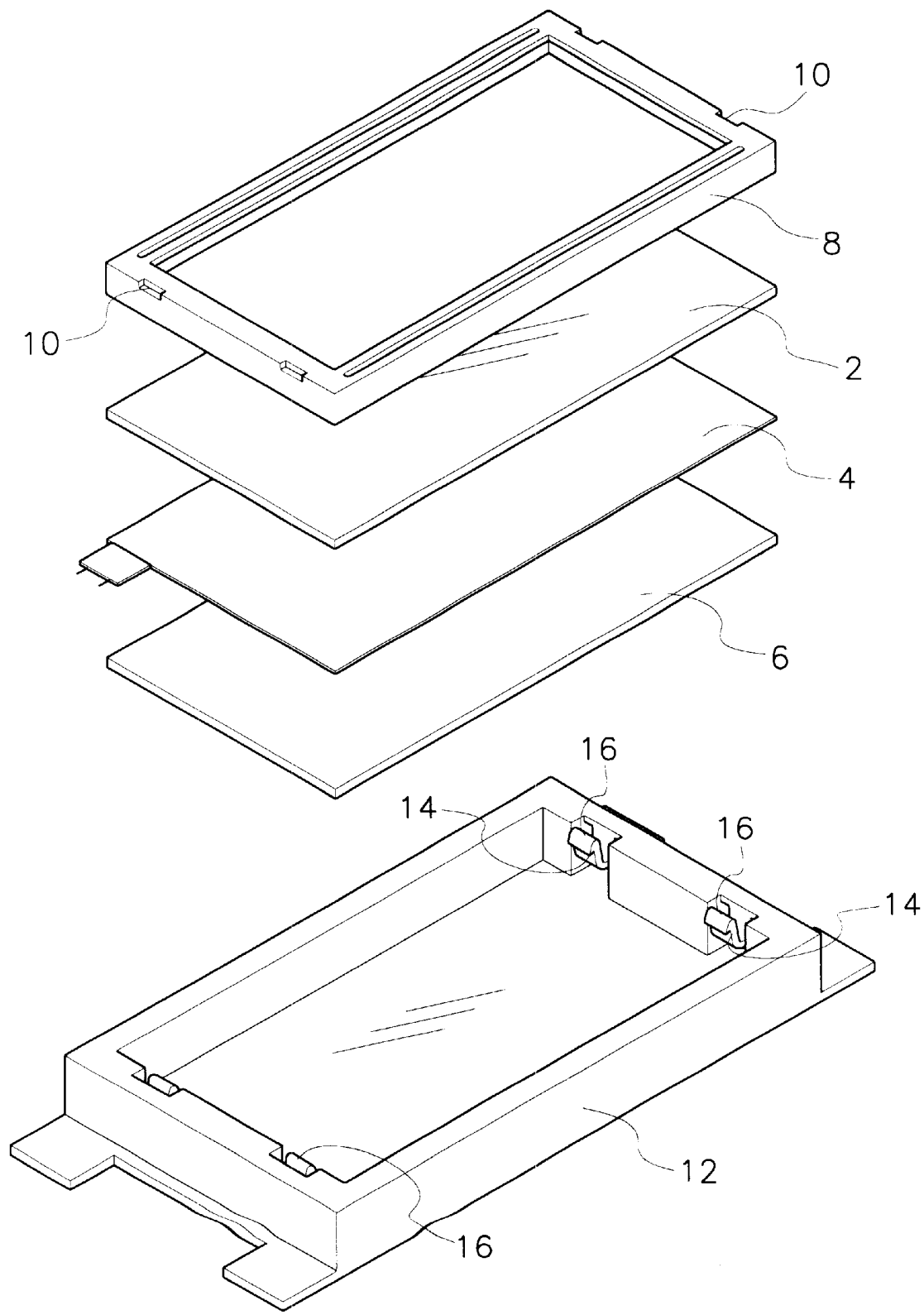
FIG. 1 is an exploded perspective view of an LCD assembly according to a preferred embodiment of the present invention.

FIG. 1 shows a liquid crystal display mounting assembly according to a preferred embodiment of the present invention.

As shown in the drawing, a circuit board 6, a back light 4 and a liquid crystal cell 2 are layered in this order and received within a metal frame 8.

The metal frame 8 is designed without any legs. The metal frame 8 is provided with a plurality of concave step portions 10 at its opposite side top ends.

The metal frame 8 receiving the liquid crystal cell 2, the back light 4 and the circuit board 6 are mounted within a synthetic resin mould 12.

The mould 12 is provided at its inner edges with a plurality of U-shaped suspensions 14 corresponding to the concave step portions 10 of the metal frame 8. A hook 16 is formed on each free end of the suspensions 14 such that the hook 16 is fixedly hooked on the corresponding concave step portion 10 of the metal frame 8 when the metal frame 8 is mounted within the mould 12.

Figure 2:
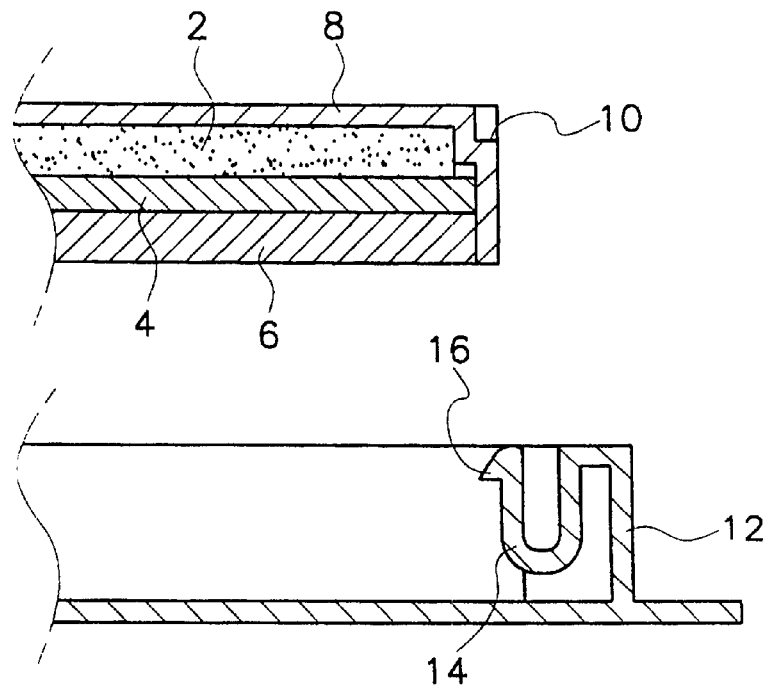
FIG. 2 is a side sectional view of a cell frame depicted in FIG. 1 before it is assembled.
Figure 3:
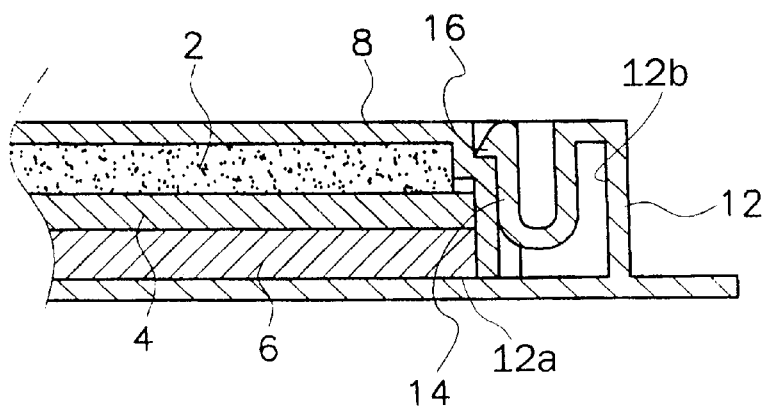
FIG. 3 is a side sectional view of a cell frame depicted in FIG. 1 after it is assembled.

Describing the above-described structure in more detail with reference to FIG. 2, during the process for coupling the metal frame 8 to the mould 12, an outer wall of the metal frame 8 contacts the upper end of the hook 16 and is inserted into the mould 12 while pushing the upper end of the hook 16.

When the hook 16 is pushed, the U-shaped suspension 14 is deformed by its elasticity to allow the metal frame 8 to be fitted into the mould 12. Next, the concave step portion 10 meets the hook 16 and the hook 16 is restored to its initial portion by the elasticity of the U-shaped suspension 14, thereby engaging the hook 10 with the concave step portion 10.

As described above, the metal frame 8 does not directly contact the inner sidewall mould 12 but is supported by the U-shaped suspension 14 with the hook 16 engaged with the concave step portion 10. Each one of the U-shaped suspensions 14 includes one end of the suspension contacting the frame 8 and another end being integrally formed with the mould 12. The plurality of suspensions 14 are integrally formed within the inner edges of the mould 12 to support the frame 8 by urging an outer wall of the frame 8 against an inner bottom wall 12a of the mould 12 but the frame 8 is not in direct contact with an inner sidewall 12b of the mould 12. As a result, the arrangement of the liquid crystal cell 2, the back light 4 and the circuit board 6 is securely fixed within the mould 12 even when the legs of the prior art are not formed at a bottom of the metal frame 8.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A liquid crystal display mounting assembly, comprising:

a frame receiving a liquid crystal cell, said frame being provided with a plurality of concave step portions;

a mould receiving said frame; and a plurality of suspensions integrally formed with said mould to support said frame by urging an outer wall of said frame against an inner bottom wall of said mould, the suspensions being formed corresponding to the concave step portions, each of the suspensions being U-shaped and provided with a hook, said hook being hooked on the corresponding concave step portion of said frame, said frame not being in direct contact with any inner sidewall of said mould.

* * * * *